(12) United States Patent
Karlsson

(10) Patent No.: US 8,948,290 B2
(45) Date of Patent: *Feb. 3, 2015

(54) METHOD AND ARRANGEMENT FOR SYMBOL MAPPING IN COMMUNICATION SYSTEMS UTILIZING OFDM-TECHNIQUES

(71) Applicant: Unwired Planet, LLC, Reno, NV (US)

(72) Inventor: Jonas B. Karlsson, Sollentuna (SE)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,277

(22) Filed: Oct. 31, 2013

(65) Prior Publication Data

US 2014/0056377 A1   Feb. 27, 2014

Related U.S. Application Data

(63) Continuation of application No. 12/520,220, filed as application No. PCT/SE2006/050612 on Dec. 21, 2006, now Pat. No. 8,599,948.

(51) Int. Cl.
*H04B 7/02* (2006.01)
*H04L 27/28* (2006.01)
(Continued)

(52) U.S. Cl.
CPC ............. *H04L 27/28* (2013.01); *H04L 1/0606* (2013.01); *H04L 1/0618* (2013.01); *H04L 5/0044* (2013.01)
USPC ........... 375/267; 375/260; 375/347; 375/299; 375/146; 375/135; 455/101; 455/103; 455/102; 455/452.1

(58) Field of Classification Search
CPC ..... H04L 5/0023; H04L 7/066; H04L 7/0669; H04L 1/0618; H04L 27/2626; H04L 7/068; H04L 7/04; H04L 7/02; H04L 7/01; H04L 1/0625; H04L 25/0204; H04L 1/0026; H04L 1/0041; H04L 1/06; H04L 1/0606; H04L 1/0643; H04L 1/0668; H04L 1/009; H04L 2025/03426; H04L 27/20; H04L 27/26; H04L 27/36; H04L 5/0016; H04L 5/0044; H04L 5/0014; H04L 5/0005; H04L 5/0078; H04B 7/0413; H04B 7/08

USPC ................. 375/260, 267, 299, 347, 146, 135; 455/500, 61, 101, 102, 103, 105, 455/452.1; 370/329, 208, 330, 204, 436

See application file for complete search history.

(56) References Cited

U.S. PATENT DOCUMENTS

| 8,599,948 B2 * | 12/2013 | Karlsson ................ 375/267 |
| 2005/0237971 A1 | 10/2005 | Skraparlis |
| 2006/0203711 A1 * | 9/2006 | Oh et al. ................ 370/208 |

FOREIGN PATENT DOCUMENTS

| CN | 1435011 A | 8/2003 |
| CN | 1685681 A | 10/2005 |

(Continued)

OTHER PUBLICATIONS

Choi et al, "Mapping Optimization for Space-Time Block Coded OFDM Systems with Iterative Decoding", 2005 IEEE 61$^{st}$ Vehicular Technology Conference (VTC 2005—Spring), Seoul, South Korea, May 30-Jun. 1, 2005, vol. 2, pp. 1230-1234.

(Continued)

*Primary Examiner* — Rahel Guarino
(74) *Attorney, Agent, or Firm* — Nixon & Vanderhye, P.C.

(57) ABSTRACT

The present invention relates to a method and arrangement for symbol mapping in wireless communication systems utilizing OFDM transmission technology in combination with advanced coding schemes. In the method according to the present invention, adapted for use in a wireless communication system utilizing OFDM transmission technology, an OFDM grid is defined by at least a first dimension and a second dimensions from the dimensions time, frequency or space. The advanced coding scheme, for example Alamouti coding, outputs symbols that are related via the coding. At least some of the symbols, defining a code related symbol group should experience identical, or at least very similar, radio channels. According to one embodiment of the present invention, symbols from the same code related symbol group is placed as close together in the OFDM grid as possible.

20 Claims, 7 Drawing Sheets

(51) Int. Cl.
*H04L 1/06* (2006.01)
*H04L 5/00* (2006.01)

(56) References Cited

FOREIGN PATENT DOCUMENTS

| CN | 1852280 A | 10/2006 |
|---|---|---|
| EP | 1 701 464 A1 | 9/2006 |
| JP | 2004-112471 A | 4/2004 |
| JP | 2004-328464 A | 11/2004 |
| JP | 2005-012357 A | 1/2005 |
| JP | 2006-121289 A | 5/2006 |
| JP | 2006-229575 A | 8/2006 |
| JP | 2008-533801 A | 8/2008 |

OTHER PUBLICATIONS

Chinese Search Report dated Jan. 12, 2013 in Chinese application 200680056734.5.
Alamouti, "A Simple Transmit Diversity Technique for Wireless Communications", IEEE Journal on Select Areas in Communication, Vo. 16, No. 8, Oct. 1998, pp. 1451-1458.

* cited by examiner

METHOD AND ARRANGEMENT FOR SYMBOL MAPPING IN COMMUNICATION SYSTEMS UTILIZING OFDM-TECHNIQUES

This application is a continuation of U.S. patent application Ser. No. 12/520,220 filed Jun. 19, 2009, which is a National Phase application of PCT application PCT/SE06/050612 filed Dec. 21, 2006, the entire contents of each of which are incorporated by reference herein.

BACKGROUND

1. Field of Invention

The present invention relates to symbol mapping in wireless communication systems. In particular, the present invention relates to symbol mapping in systems utilizing OFDM and advanced coding schemes.

2. Background of the Invention

Orthogonal Frequency Division Multiplexing (OFDM) has become a widespread technique in several wide-band digital communication systems. OFDM-techniques are used both in wire-bound systems such as ADSL and wireless systems such as WLAN. Recently OFDM has been selected as one of the transmission techniques in the next generation of mobile communication, 4G. OFDM offers high spectral efficiency and is fairly robust to interference and multipath propagation. Additionally OFDM can adapt to varying channel conditions without complex equalization.

In systems using OFDM, the symbols are, after channel coding and modulation, mapped onto a two-dimensional time-frequency grid. This grid might also have a third dimension, the space dimension, if a wireless system utilizing multiple transmit antennas. The grid or matrix, which is a characteristic of the OFDM-techniques, defines resource-units, which are the smallest addressable entities in the system. Illustrated in FIG. 1a is a two-dimensional OFDM grid with a vertical frequency axis, and a horizontal time axis. Four different frequencies, $f_1$-$f_4$, and seven time-slots, $t_1$-$t_7$, are utilized, each frequency/time-slot pair representing one resource-unit, giving 28 individually addressable resource-units. In FIG. 1b a space dimension is added, in the form of a 4 antenna scenario, illustrating the spreading of signals on the 4 antennas. In the following, for clarity, only the frequency-time grid is illustrated, although the space dimension is present in implementations using multiple antennas.

The coded and modulated symbols are conventionally mapped on the OFDM resource-units in an ordered fashion. The mapping can be done in several different ways. Firstly, the mapping can be done row-wise or column-wise. Secondly, the rows can be filled either from left-to-right or from right-to-left, and thirdly, the columns can either be filled top-to-bottom or bottom-to-top, giving eight different ways of mapping in total. One example is given in FIG. 1a wherein the mapping has been performed row-wise (frequency), left to right and top to bottom.

In combination with spectrum effective transmission technologies such as OFDM, the high speed communication envisaged with present and future communication systems relies on advanced coding schemes. The purpose of the coding schemes is to improve the reliability of the data transfer, and hence reduce the number of retransmissions (lower Bit Error Rate (BER)). The redundancy introduced with the coding generally reduces the transmission rate compared to an ideal loss-less transmission. However, the effective rate is, if an appropriate coding is utilized, improved. Novel coding schemes often referred to as space-time block codes (STBCs), offer redundancy with little effect on the ideal rate. The STBC coding scheme that has received most attention, the Alamouti code, "A Simple Transmit Diversity Technique for Wireless Communications" IEEE Journal on Selected Areas in Communication, vol. 16, no. 8, October 1998, pp. 1451-1458, offers full-rate, i.e. coding redundancy without reducing the rate. According to the coding scheme two symbols are jointly coded and transmitted over two resource-units, i.e. over two sub-carriers or two time slots. The performance depends on the similarity, as regards channel conditions, between the two resource-units. Other advanced coding schemes have similar requirements.

As certain relations between resource-units, for example radio channel conditions being as identical as possible, can be a prerequisite for a good performance of the coding, advanced coding schemes such as the Alamouti inflict requirements on the mapping of symbols on the OFDM grid.

SUMMARY OF THE INVENTION

OFDM transmission technology and advanced coding schemes such as space-time block codes are capable of providing very high data rates in wireless systems. However, the technologies have to interact in a constructive way, which has not always been the case in prior art techniques.

The object of the present invention is to provide a method and arrangement that overcome the drawbacks of the prior art techniques. This is achieved by the method and the transmitting node, as defined in the claims.

In the method according to the present invention, adapted for use in a wireless communication system utilising OFDM transmission technology, an OFDM grid is defined by at least a first dimension and a second dimensions from the dimensions time, frequency or space. Advanced coding schemes produce symbols that are related through the coding. According to the invention the mapping of symbols related through the coding is dependent on the preferences set forth by the coding scheme. Some of the symbols related through the coding should experience identical, or at least similar, radio channels in order for the coding to be optimized. These symbols, defining a code related symbol group, is according to an embodiment of the invention, placed as close together in the OFDM grid as possible. Examples of coding schemes include, but is not limited to, STBC coding schemes, such as the Alamouti coding scheme.

The method according to the invention, comprises the main steps of:
  placing a first symbol from a first code related symbol group at a first position in the grid;
  placing, if a second symbol belongs to the same code related symbol group as the first symbol, the second symbol at a second position as close to the position of the first symbol as possible.

If the second symbols does not belong to the same code related symbol group as the first symbol, the second symbol can be placed freely in the OFDM grid. However, care should be taken to achieve an effective filling of the grid. The second position may represent no change in one dimension and a change to an adjacent position in the other dimension. For example, if frequency is the first dimension, the second symbol is placed at a position with an equal value in frequency as the first symbol, but with a different value in the other dimension, i.e. in a different time-slot.

In various versions, representing different embodiments of the invention, apart from fulfilling the requirements set forth by the advanced coding scheme, care is also taken to fill the OFDM grid in an effective way. According to one embodiment a row-wise mapping is utilized, a row corresponding to one dimension and a column to another dimension. Every other row will be filled left-to-right and the other rows right-to-left. Alternatively a column-wise mapping is utilized, a row corresponding to one dimension and a column to another dimension, and every other column should be filled top-to-bottom and the other columns bottom-to-top.

The external radio environment could be such that a change of position in one dimension is more critical than a change in another dimension. In a multipath fading scenario, for example, a shift in frequency can give a dramatically different radio channel. In such case it is favourable to try to map symbols from one code related symbol group at positions in the OFDM grid having the same frequency. For a mobile station, or user equipment, travelling at high speed it is favourable to transmit at the same timeslot in order to keep the radio channel similar. According to one embodiment of the invention a preferred dimension is determined based at least partly on external radio environment factors, the preferred dimension indicating that a change in that dimension would have lower impact on the radio channel characteristics than in the other dimension. In the mapping process it is prioritised to change value only in the preferred dimension for symbols of the same code related symbol group.

Thanks to the invention it is possible to optimize the combined usage of advanced coding schemes and OFDM transmission technology.

One advantage is that the method according to the invention is simple to implement and does not require extensive processing resources.

A further advantage afforded by the inventive method is that external radio environment factors can be taken into account in the mapping process.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein FIG. 1a-b schematically illustrates the mapping of symbols on a OFDM grid according to prior art mapping schemes in (a) two dimensions, frequency and time, and (b) three dimensions, frequency, time and space.

DETAILED DESCRIPTION OF THE INVENTION

In a communication system wherein the present invention may be utilized, a plurality of entities share communication resources. The communication system may be of the cellular type, one radio node being a base station (BS) in communication with a plurality of mobile stations (MS), or user equipment (UE), as in current and future versions of UMTS. Such a system may also comprise mobile and fixed relay stations. Other systems also sharing radio resources include different kinds of ad hoc systems and multihop systems, wherein user equipment typically also acts as relay stations forwarding a message towards an end node. Such systems normally have much less order structure than the cellular system. In the following the method and arrangement according to the present invention will be exemplified in a cellular (wireless) scenario. However, as appreciated by the skilled in the art the invention may, with only slight modifications, be applicable also to other types of communication systems wherein the communication resources are shared between a plurality of users, for example ADSL/VDSL-based systems and WLAN systems.

Figure 1A:
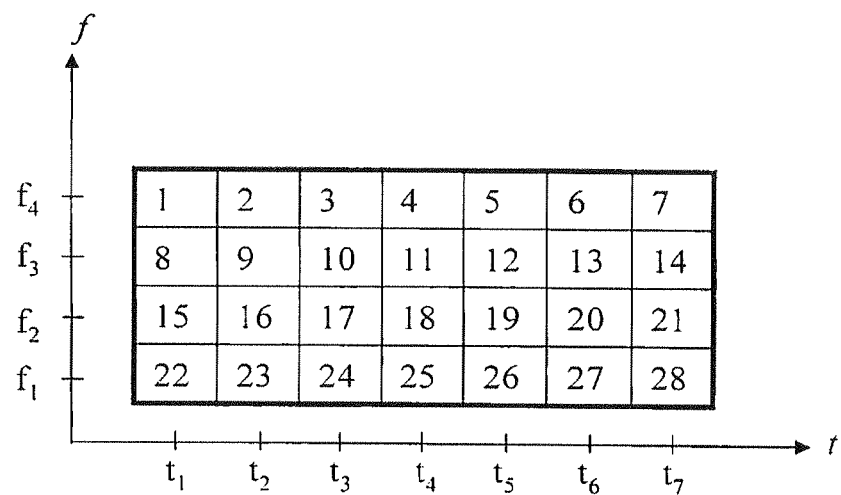
Figure 1B:
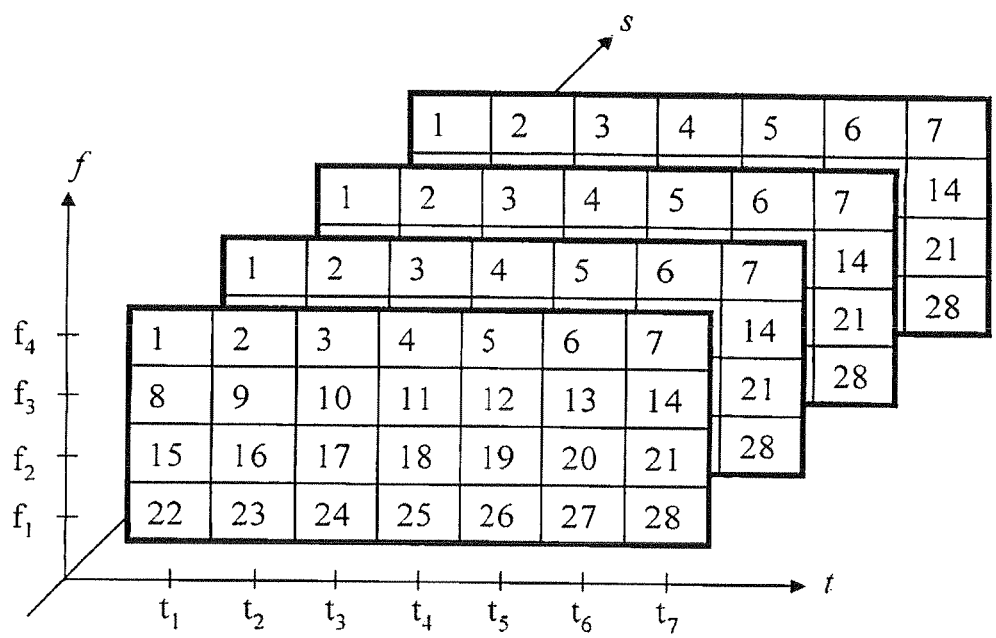

In the wireless system using OFDM, the symbols are mapped onto a two- or three-dimensional grid as described with reference to FIG. 1a-b, for example row-wise left-to-right and top to bottom.

Some advanced coding schemes, e.g. the Alamouti code, which will be used as a non-limiting example, restrain how the mapping should be performed. By the Alamouti code two incoming symbols are coded into four outgoing sub-symbols and the four sub-symbols are mapped onto two, preferably uncorrelated, antennas and two resource-units. The resource-units should experience the same radio channel, or at least radio channels that are as similar as possible. The two sub-symbols that are mapped on the same resource-unit are hereafter referred to as a symbol. The radio channel will be as similar as possible if these symbols are placed as close as possible to each other in the time-frequency OFDM grid. If the symbols are placed with a too large distance in the grid, the performance in terms of bit error rate, block error rate, throughput and delay will be reduced.

Figure 2A:
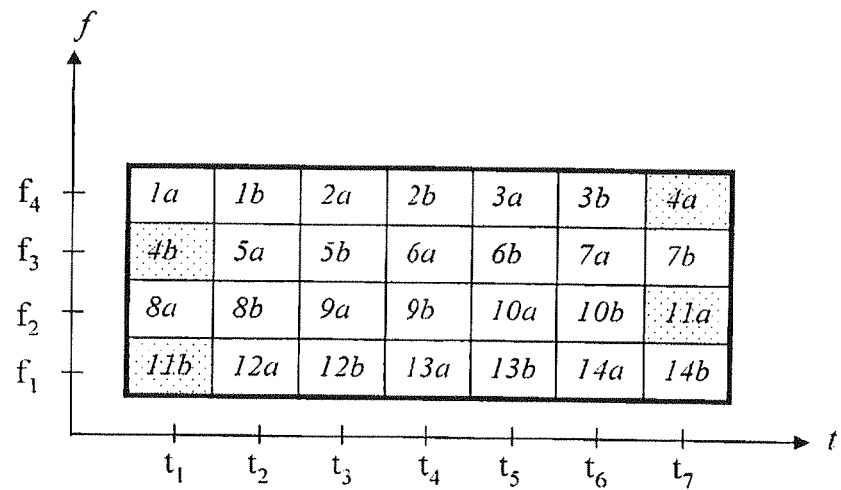
FIG. 2a-b schematically illustrates the problems arising under certain conditions using prior art mapping schemes.

The prior art mappings described above are not suitable if the number of symbols that are coded together is not a divisor of the number of symbols that will fit into one row, in the case of row-wise mapping, or in one column, in the case of column-wise mapping, as illustrated in FIG. 2a, wherein the "pairs" resulting from the Alamouti coding are denoted 1a-1b, 2a-2b, etc. In the exemplary figure some symbol pairs are mapped closely together, for example symbols 1a and 1b and symbols 2a and 2b. Due to the mismatch between the available positions (resource-units) in a row and the paired symbols, some of the symbol pairs are not mapped close to each other, for example symbols 4a and 4b, and symbols 11a and 11b.

Another problem occurs when e.g. reference symbols (or pilot symbols) or control symbols, are punctured into the OFDM grid. In the example shown in FIG. 2b, the number of symbols coded together is a divisor of the number of symbols per row. Due to the positions used by other type of symbols, not all jointly coded symbols can be placed in positions close to each other.

Figure 3:
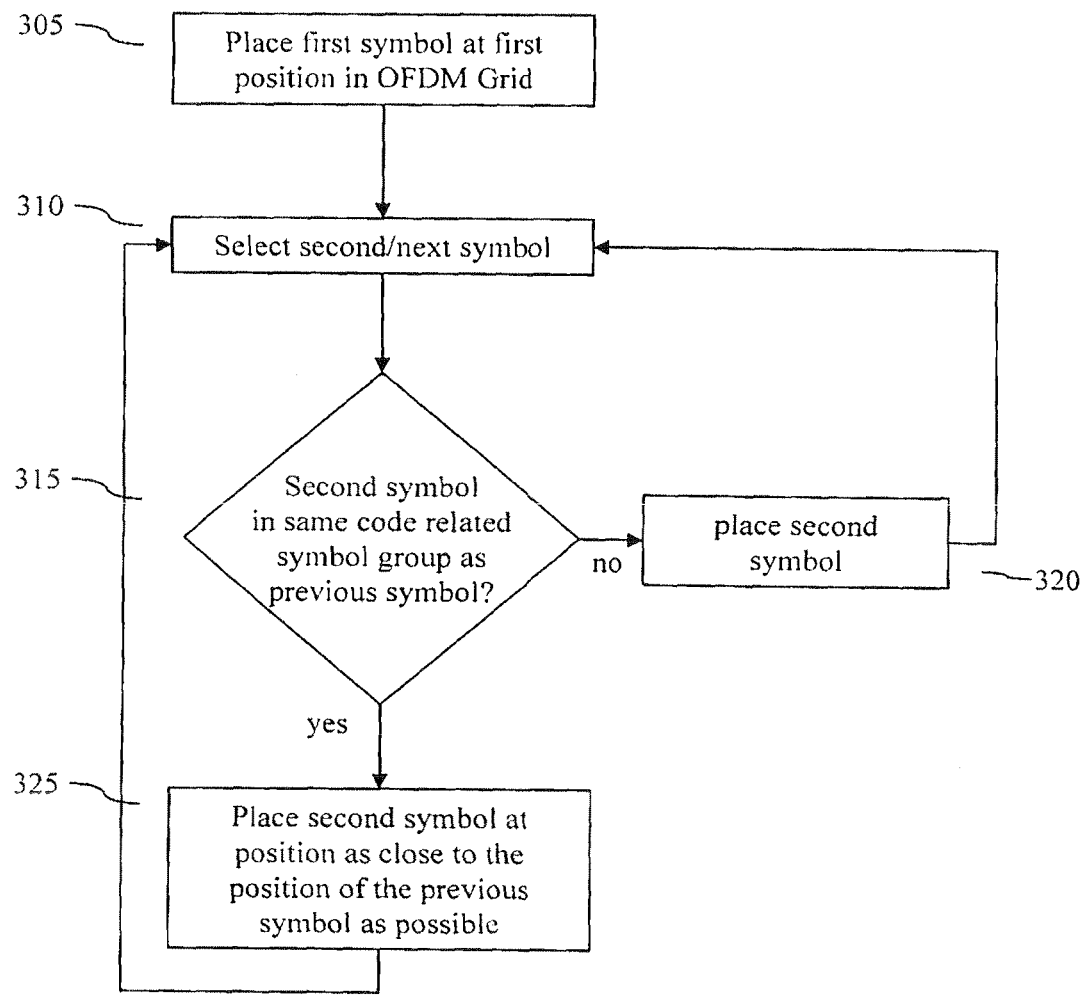
FIG. 3 is a flowchart of a method according to the present invention.

According to the method of the invention symbols are mapped on the OFDM grid in a manner that optimizes the performance of the advanced coding scheme as much as possible. In the method at least a first and a second dimension are defined, for example frequency and time, forming an at least two-dimensional grid. The symbols to be mapped on the grid are grouped according to the output from the coding scheme used. Symbols that have a coding relation to each other and requiring similar radio channels, are referred to as a code related symbol group. If Alamouti code is used the code related symbol group takes up two positions in the grid. It should be noted that, as described above, the coding scheme may produce output sub-symbols that should be placed in a third, preferably uncorrelated, dimension, typically the spatial dimension. The mapping of symbols is illustrated in the flowchart of FIG. 3. The Alamouti coding routine, preceding the steps of the method, outputs a sequence of subsequent symbols to be placed in the OFDM grid. The method comprises the steps of:

305: Placing a first symbol at a first position in the grid.

310: Selecting a subsequent second symbol.

315/325: If the second symbol belongs to the same code related symbol group as the previous symbol, placing the second symbol at a second position as close to the position of the previous symbol in the same code related symbol group as possible.

315/320: If the second symbol does not belong to the same code related symbol group as the previous symbol, placing, the second symbol "freely" in the OFDM grid. However, care can be taken to get an ordered filling of the grid.

Steps 310-325 are repeated with the next subsequent symbol until the grid is filled.

The placing of the second symbol at a second position in step 325 is preferably performed so that the second position represents no change in one dimension and a change to an adjacent position in the other dimension. If that is not possible, a next nearest position is chosen, and so on. For example, if frequency is the first dimension, the second symbol is placed at a position with an equal value in frequency as the first symbol, but with a different value in the other dimension, i.e. in a different time-slot.

The above will result in a pseudo random-walk, that might be unfavorable in terms of effectively filling the grid. The method may therefore be modified according to, illustrated in the flowchart of FIG. 4:

402: Selecting/determining a first preferred dimension, e.g. time, and a first preferred direction associated to the first dimension, e.g. increasing, and a second preferred direction, e.g. decreasing associated with the second dimension, e.g. frequency.

405: Placing a first symbol at a first selected position in the grid, the position for example representing the lowest value in the first dimension and the highest value in the second dimension.

410: Selecting a subsequent second symbol.

415/420: Placing, if possible, the next symbol in the next position in the preferred direction in the first preferred dimension (the next time-slot).

425/430: If it was not possible to position the next symbol adjacent to the first symbol in the first preferred dimension and in the preferred first direction (time), placing the second symbol in the next position in the second preferred direction (decrease), i.e. a move in the second dimension (frequency).

435: Placing the second symbol at a position as close to the first position as possible.

440/445: If not possible to move in the first preferred direction reverse the first preferred direction.

Steps 410-445 are repeated with the next subsequent symbol until the OFDM grid is filled.

Figure 5A:
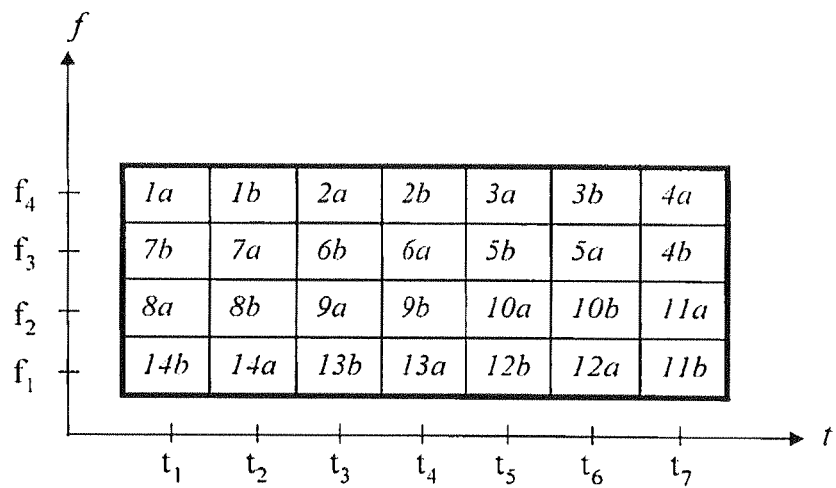
FIG. 5a-c schematically illustrates the mapping produced by a method according to the present invention.

The above described method of mapping can be envisaged as changing the direction of filling the symbols into the two-dimensional grid if needed. If row-wise mapping is used, every other row will be filled left-to-right and the other rows right-to-left. If column-wise mapping is used, every other column should be filled top-to-bottom and the other columns bottom-to-top. This will also give eight different ways of doing the mapping, in the same way as described for the prior art mapping. The result of such mapping is illustrated in FIG. 5a, wherein the symbols are coded together two and two, and were all the symbol pairs are mapped close to each other using the invented mapping. The mapping is done row-wise, starting left-to-right, alternating with right-to-left, and top-to-bottom.

Figure 2B:
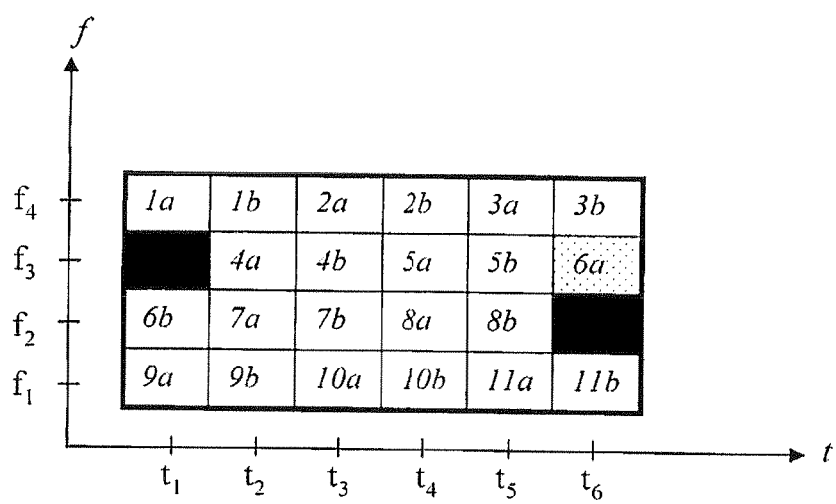
Figure 4:
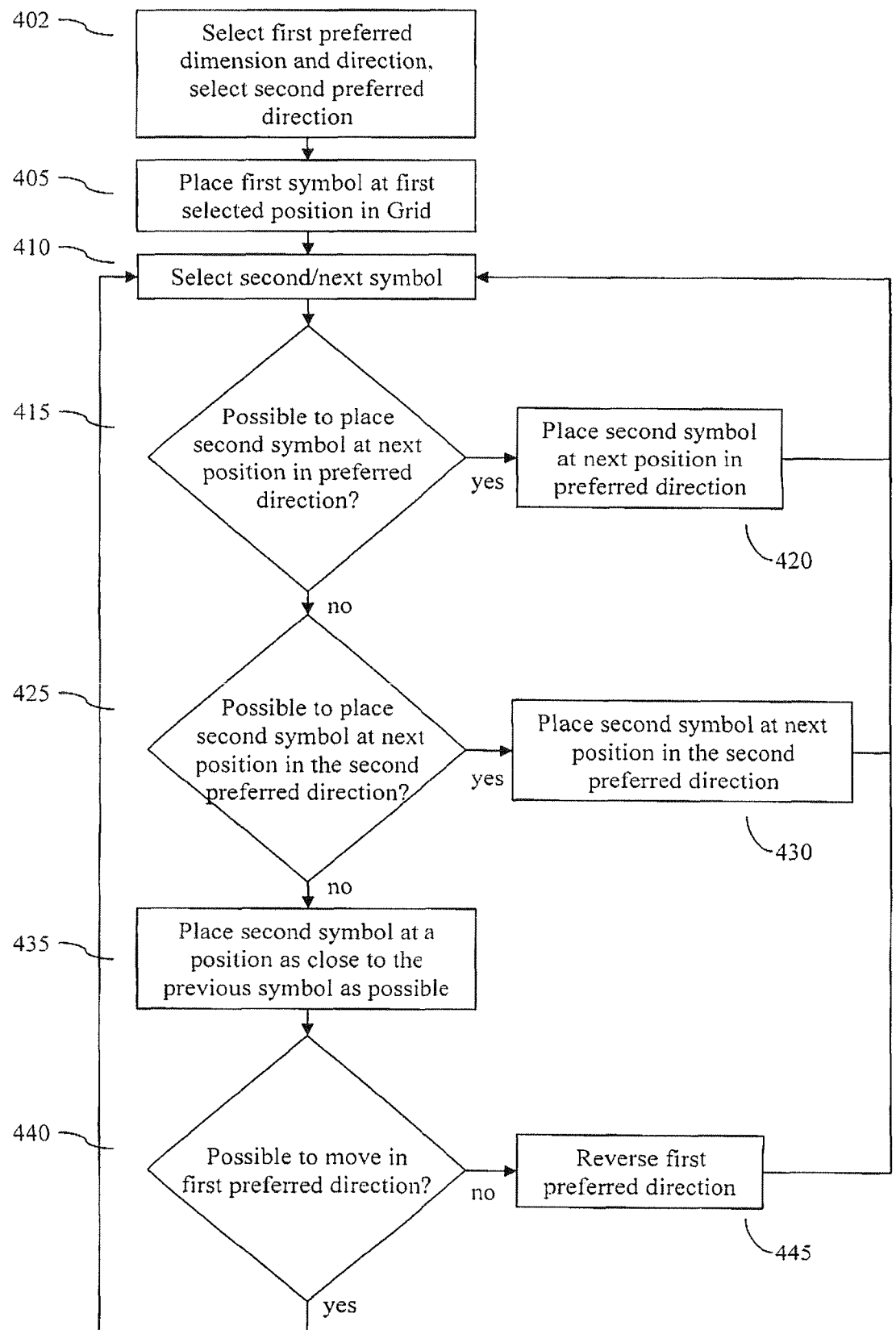
FIG. 4 is a flowchart of an embodiment of a method according to the present invention.
Figure 5B:
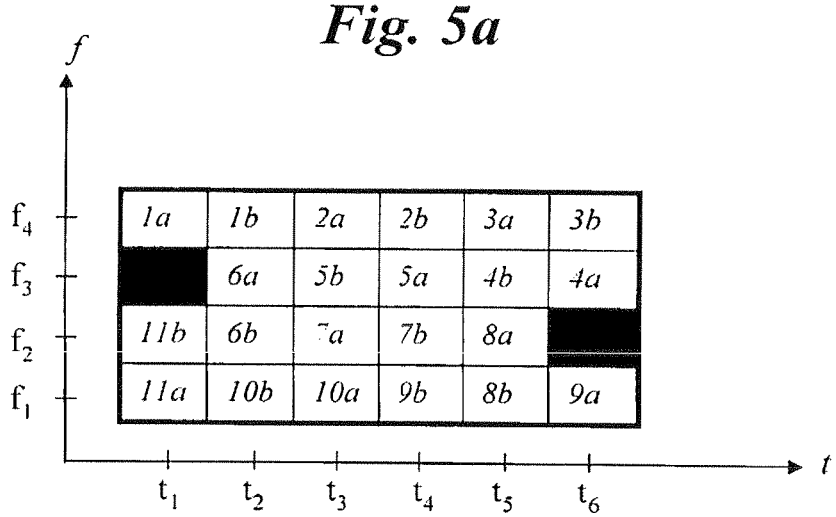
Figure 5C:
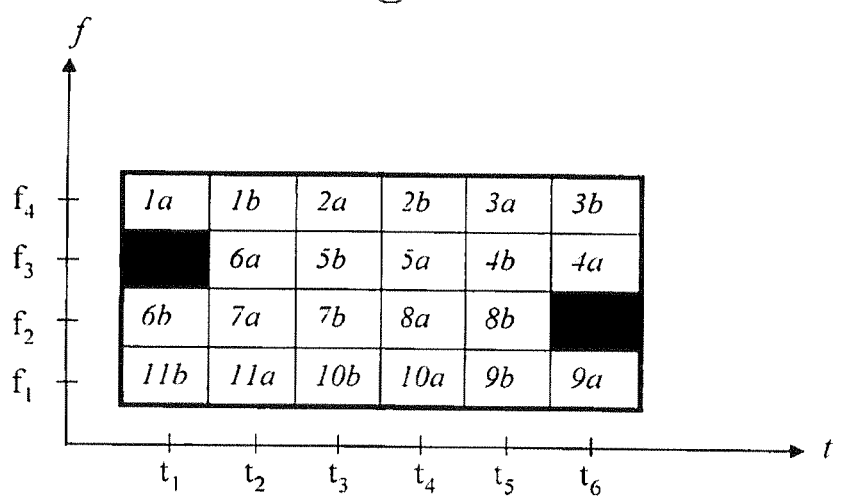

In a situation as described with reference to FIG. 2b, wherein positions are reserved for certain type of signaling the embodiment described with reference to the flowchart of FIG. 4 would give the grid illustrated in FIG. 5b. Other constraints could be introduced in the method to prefer a next nearest position over a nearest, if such a choice gives a more effective filling of the grid. The result of such a modification, representing an embodiment of the method, is illustrated in FIG. 5c. A similar approach is to introduce a constraint that the row-wise (or column-wise) back and forth filling should be kept regardless of the reserved positions.

Under certain circumstances it may be preferred that the placing of symbols in one code related symbol group is constant with respect to one dimension in the grid. For example, all symbols in a code related symbol group are given the same frequency or timeslot. This could be the case if the UE is traveling at relatively high speed. In order to satisfy the requirement of similar radio channels for all symbols, according to the Alamouti code, the placing of symbols in a code related symbol group should preferably be within the same timeslot, i.e. a column-wise mapping if referring to the exemplary illustrations of FIG. 5a-c. Another scenario is in a situation wherein the UE is in a geographical position characterized by complex multiple path fading. In such a scenario a constant frequency for all symbols in the code related symbol group is preferred, corresponding to a row-wise mapping in FIG. 5a-c. The preferences due to the radio conditions exemplified above, will be referred to as "external radio environment factors".

Figure 6:
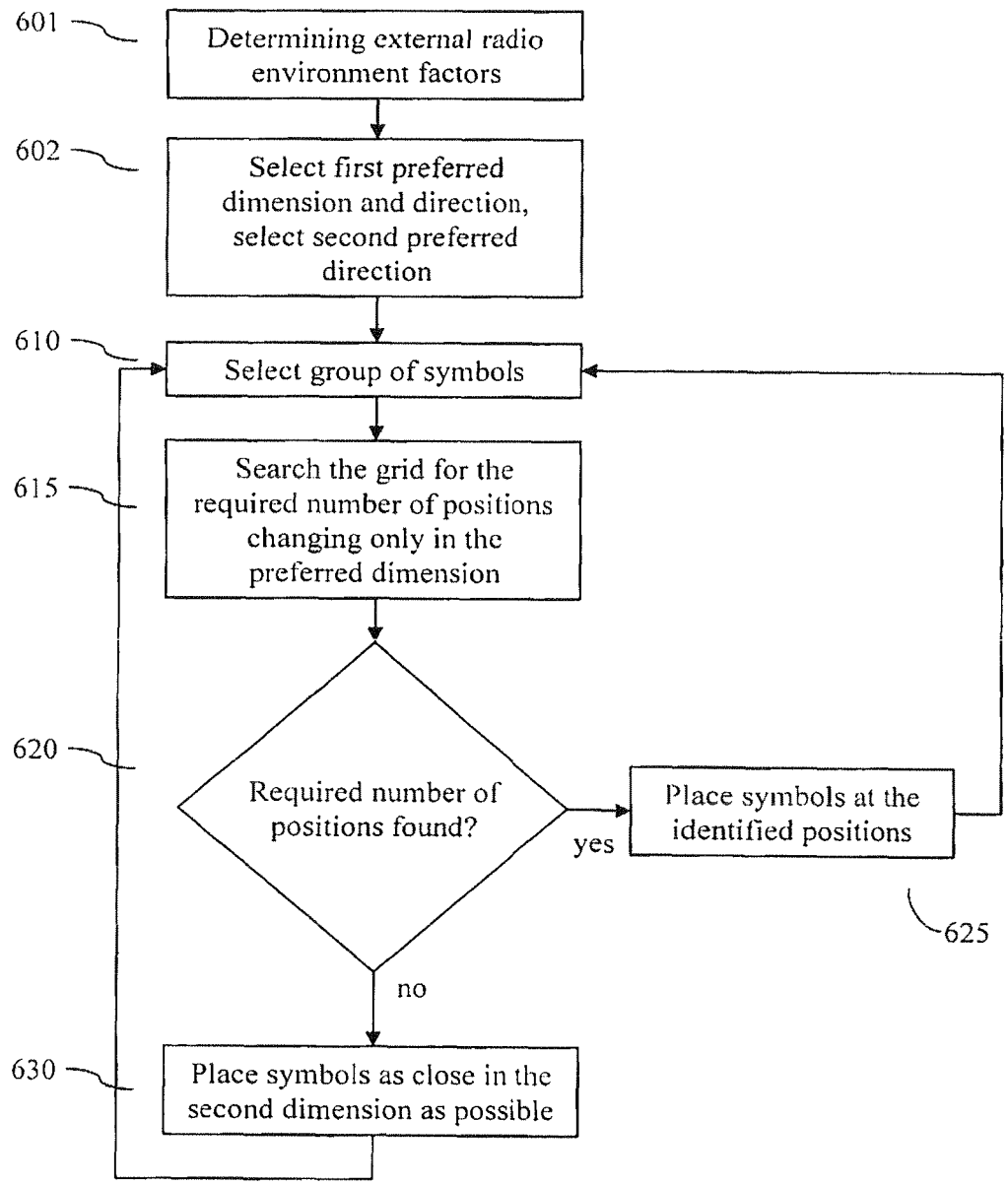
FIG. 6 is a flowchart of an embodiment of a method according to the present invention.

A modification of the method, representing an embodiment of the invention, taking the external radio environment factors into account, is illustrated in the flowchart of FIG. 6, and comprises the steps of:

601: Determining the external radio environment factors, i.e. if the radio conditions between the BS and the UE are such that a change in one dimension would cause lower impact on the characteristics of the radio channel, than in another.

602: Selecting/determining a first preferred dimension. e.g. time, based on the external radio environment factors and a first preferred direction associated to the first dimension, e.g. increasing, and a second preferred direction, e.g. decreasing associated with the second dimension, e.g. frequency. The first preferred dimension should correspond to the dimension wherein the change of position causes the lowest impact on the characteristics of the radio channel.

610: Select group of symbols, i.e. all symbols of a code related symbol group.

615: Search the grid, for example starting from the position representing the lowest value in the first dimension and the highest value in the second dimension, after a number of positions changing only in the preferred dimension, the number of positions corresponding to the number of symbols in the code related symbol group. Preferably the positions are consecutive, to minimize the change also in the preferred dimension.

620/625: Placing, if the required number of positions in the preferred dimension were identified, the symbol of the code related symbol group in the identified positions.

620/630: If not possible to find the required number of positions changing only in the preferred dimension, placing the symbols of the code related symbol group as close in the second dimension as possible.

The steps 610-630 are repeated with the next code related symbol group until the grid is filled.

The external radio environment factors can be determined by known methods. In fact, the external radio environment factors are in many cases already present in the BS, for example, as a result of characterizing the radio channels and/or estimating the speed of a UE for other purposes.

If, for example, a UE is traveling at high speed while maintaining a communication, the radio channel changes rapidly in time. Hence, in order to maintain a similar radio channel over the symbols in a code related symbol group, the symbols should preferably be transmitted on positions in the OFDM grid sharing the same timeslot, but with different frequency. In this case the dimension corresponding to frequency is the preferred dimension.

In a multipath fading scenario, the radio channel may vary considerably even for minor changes in frequency. In this case it is preferably to transmit all symbols of a code related symbol group on the same frequency, hence time is determined to be the preferred dimension.

Figure 7:
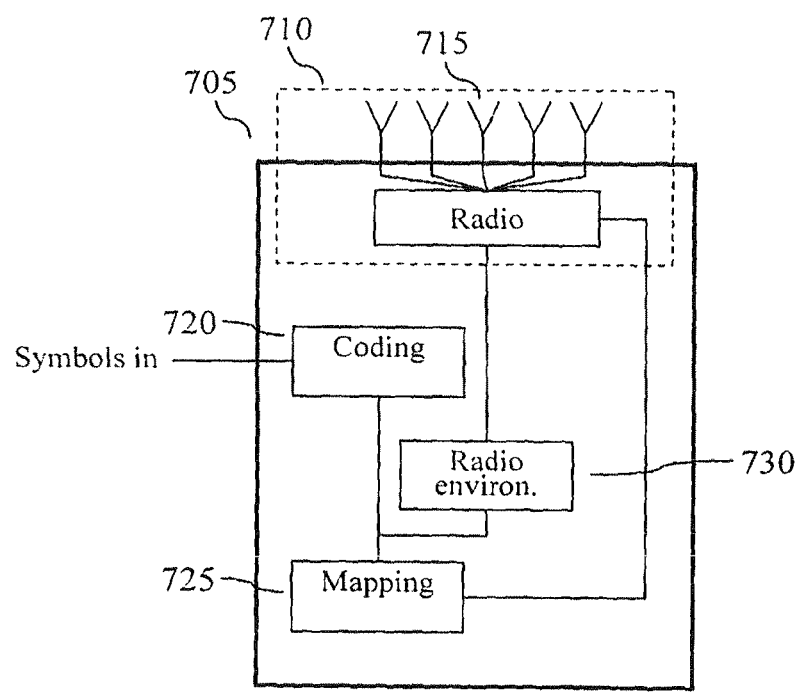
FIG. 7 schematically illustrates a transmitting node according to the present invention.

Arrangements according to the present invention in a transmitting node suitable for effectuating the above described embodiments are schematically illustrated in FIG. 7. The modules and blocks according to the present invention are to be regarded as functional parts of a base station and/or a user equipment in a communication system, and not necessarily as physical objects by themselves. The modules and blocks are preferably at least partly implemented as software code means, to be adapted to effectuate the method according to the invention. The term "comprising" primarily refers to a logical structure and the term "connected" should here be interpreted as links between functional parts and not necessarily physical connections. However, depending on the chosen implementation, certain modules may be realized as physically distinctive objects in a receiving or sending node. The term "transmitting node" should be given a broad interpretation, meaning any device, stand alone, or part of a greater entity, capable of wireless communication utilizing OFDM-technology. Examples of transmitting nodes include, but are not limited to radio base stations, user equipments such as mobile phones, PDAs and laptop computers.

The transmitting node 705 comprises radio communication means 710, which provides the necessary functionalities for performing the actual reception and transmission of radio signals and is well known by the skilled person. The radio communications means 710 are adapted to communicate utilizing OFDM technology and preferably utilizing multiple antennas 715. According to the invention the transmitting node 705 is provided with a coding module 720 adapted to code an incoming stream of symbols, for example with Alamouti coding, producing an output stream of symbols, comprising code related symbol groups that have a code relation requiring the symbols to be transmitted under very similar conditions. A mapping module 725 is in connection with the radio communication means 710 and the coding module 720. The mapping module 725 is adapted to receive the outputted stream of symbols and to map symbols on the OFDM grid. According to the invention the mapping module 725 is adapted to map symbols from code related symbol groups in a manner that is dependent on preferences set forth by the coding scheme. According to one embodiment of the invention the coding module 720 performs a STBC, e.g. Alamouti coding, and the mapping module 725 is adapted to position symbols of the same code related symbol group as close to each other as possible in the OFDM grid. Further adaptations of the mapping module 725 corresponds to the different embodiments of the method described above.

According to a further embodiment the transmitting node 705 is provided with an external radio environment determination module 730 adapted to characterize the radio environment and other radio nodes, referred to as receiving nodes, that the transmitting node 705 is in communication with. The external radio environment determination module 730 is in connection with the radio communication means for receiving data relating to the radio environment. Based on the radio environment and the characteristics of a receiving node, the external radio environment determination module 730 is adapted to provide the mapping module 725 with a preferred first dimension, and possibly a preferred direction in that dimension, the preferred dimension representing the dimension for which a change has the lowest impact on the radio channel. The external radio environment determination module 730 may include, or be in connection to, means for determining the speed and/or direction of a receiving node.

While the invention has been described in connection with what is presently considered to be the most practical and preferred embodiments, it is to be understood that the invention is not to be limited to the disclosed embodiments On the contrary, various modifications and equivalent arrangements are covered by the appended claims.

What is claimed is:

1. A method comprising:
coding, by a transmitting node having multiple antennas, an incoming symbol stream with a coding scheme to obtain an output symbol stream comprising a plurality of code related symbol groups; and
mapping, by the transmitting node, symbols of the output symbol stream to an Orthogonal Frequency Division Multiplexing (OFDM) grid for transmission by the transmitting node, each OFDM grid being defined by at least a first dimension and a second dimension selected from the dimensions time, frequency, and space, the mapping comprising:
placing a first symbol from a first code related symbol group at a first position in the OFDM grid;
determining whether a second symbol belongs to the first code related symbol group; and
when it is determined that the second symbol belongs to a same code related symbol group as the first symbol, placing the second symbol at a second position of the OFDM grid as close as possible to the first position.

2. The mapping method according to claim 1, wherein the second position represents no change in one dimension and a change to an adjacent position in the other dimension, relative to the first position.

3. The mapping method according to claim 1, wherein the coding scheme is an Alamouti coding scheme and each code related symbol group comprises two jointly coded symbols.

4. The mapping method according to claim 1, wherein mapping symbols of the output symbol stream to the OFDM grid comprises:
prior to placing the first symbol, selecting a first preferred dimension as the first dimension and a first preferred direction associated with the first dimension, and a second preferred direction associated with the second dimension;
placing, if possible, the second symbol in the next position in the preferred direction in the first preferred dimension;
when not possible to place the second symbol adjacent to the first symbol in the first preferred dimension and in the preferred first direction, placing the second symbol in the next position in the second preferred direction; and when not possible to move in the grid in the first preferred direction, reversing the first preferred direction.

5. The mapping method according to claim 1, wherein mapping symbols of the output symbol stream to the OFDM grid comprises using a row-wise mapping, a row corresponding to one dimension and a column to another dimension, and wherein every other row is filled left-to-right and the other rows right-to-left.

6. The mapping method according to claim 1, wherein mapping symbols of the output symbol stream to the OFDM grid comprises using a column-wise mapping, a row corresponding to one dimension and a column to another dimension, and wherein every other column is filled top-to-bottom and the other columns bottom-to-top.

7. The mapping method according to claim 4, further comprising determining an external radio environment factor, and selecting at least one of the first and second preferred dimensions and the first and second associated preferred directions, in dependence on the external radio environment factor.

8. The mapping method according to claim 7, wherein the selection of a preferred dimension is based on the external radio environment factor, and the selection is such that a change in the preferred dimension would have a lower impact on radio channel characteristics than a change in another dimension.

9. The mapping method according to claim 8, wherein the transmitting node, an associated receiving node, or both, are experiencing time-varying radio channels, the method further comprising selecting frequency as the preferred dimension.

10. The mapping method according to claim 8, wherein the transmitting node, an associated receiving node, or both, are experiencing multipath fading, the method further comprising selecting time as the preferred dimension.

11. The mapping method according to claim 7, wherein mapping symbols of the output symbol stream to the OFDM grid comprises:
    selecting the first preferred dimension, based on the external radio environment factors, the first preferred dimension selected as the dimension wherein the change of position causes the lowest impact on the characteristics of the radio channel;
    selecting a group of symbols comprising all symbols of a code related symbol group;
    searching the grid for a number of positions changing only in the preferred dimension, the number of positions corresponding to the number of symbols in the code related symbol group; and
    placing, when the required number of positions in the preferred dimension was identified, the symbols of the code related symbol group in the identified positions.

12. The mapping method according to claim 11, wherein mapping symbols of the output symbol stream to the OFDM grid further comprises:
    when it is not possible to find the required number of positions, placing the symbols of the code related symbol group as close together in the second dimension as possible.

13. The mapping method according to claim 11, wherein searching the grid for the number of positions changing only in the preferred dimension comprises searching for consecutive positions.

14. The method according to claim 1, wherein one of the first and second dimensions is frequency and the other dimension is time.

15. A transmitting node configured for use in a wireless communication system utilizing Orthogonal Frequency Division Multiplexing (OFDM) transmission technology, the transmitting node comprising:
    a radio transmitter adapted to transmit radio signals using multiple antennas;
    a coding module adapted to code an incoming symbol stream with a coding scheme to obtain an output symbol stream comprising code related symbol groups;
    a mapping module adapted to control mapping of symbols of the output symbol stream to an Orthogonal Frequency Division Multiplexing (OFDM) grid for transmission by the radio transmitter, each OFDM grid being defined by at least a first dimension and a second dimension selected from the dimensions time, frequency and space;
    wherein the mapping module is adapted to map the output symbol stream by:
    placing a first symbol from a first code related symbol group at a first position in the OFDM grid;
    determining whether a second symbol belongs to the first code related symbol group; and
    when it is determined that the second symbol belongs to a same code related symbol group as the first symbol, placing the second symbol at a second position in the OFDM grid as close as possible to the first position.

16. The transmitting node according to claim 15, wherein the coding module is adapted to perform Space-Time Block Coding (STBC).

17. The transmitting node according to claim 15, wherein the second position represents an equal value as that of the first position in one dimension of the OFDM grid and an adjacent value in the other dimension of the OFDM grid.

18. The transmitting node according to claim 15, wherein the mapping module is adapted to use a row-wise mapping, a row corresponding to one dimension of the OFDM grid and a column to another dimension of the OFDM grid, and wherein every other row is filled left-to-right and the other rows right-to-left.

19. The transmitting node according to claim 15, wherein the mapping module is adapted to use a column-wise mapping, a row corresponding to one dimension of the OFDM grid and a column to another dimension of the OFDM grid, and wherein every other column is filled top-to-bottom and the other columns bottom-to-top.

20. The transmitting node according to claim 16, further comprising an external radio environment determination module in connection with the radio transmitter and the mapping module, the external radio environment determination module adapted to:
    characterize the radio environment between the transmitting node and a receiving node that the transmitting node is in communication with; and
    based on the characterization, provide the mapping module with a preferred first dimension of the OFDM grid, the preferred first dimension representing the dimension of the OFDM grid in which a change has the lowest impact on the radio channel characteristics.

* * * * *